(12) United States Patent
Huang

(10) Patent No.: US 8,204,212 B2
(45) Date of Patent: Jun. 19, 2012

(54) PHONE AND METHOD FOR REDUCING NOISE IN A SUBSCRIBER LINE INTERFACE CIRCUIT THEREOF

(75) Inventor: Jia-Xuan Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 506 days.

(21) Appl. No.: 12/504,796

(22) Filed: Jul. 17, 2009

(65) Prior Publication Data

US 2010/0322389 A1    Dec. 23, 2010

(30) Foreign Application Priority Data

Jun. 19, 2009    (CN) .......................... 2009 1 0303439

(51) Int. Cl.
*H04M 9/00* (2006.01)
*H04M 1/76* (2006.01)
*H04M 7/00* (2006.01)

(52) U.S. Cl. .............. 379/417; 379/29.04; 379/399.01

(58) Field of Classification Search ............. 379/9.06, 379/29.04, 398, 399.01, 403, 413.01, 416, 379/417
See application file for complete search history.

(56) References Cited

U.S. PATENT DOCUMENTS

| | | | | |
|---|---|---|---|---|
| 4,622,441 | A | * | 11/1986 | Martin ........................ 379/345 |
| 7,130,414 | B2 | * | 10/2006 | Enriquez et al. ......... 379/399.01 |
| 2004/0076289 | A1 | * | 4/2004 | Boudreaux, Jr. ............... 379/413 |
| 2009/0296920 | A1 | * | 12/2009 | Cox ........................ 379/406.07 |

FOREIGN PATENT DOCUMENTS

CN    1138399 C    2/2004

* cited by examiner

*Primary Examiner* — Quoc D Tran
(74) *Attorney, Agent, or Firm* — Altis Law Group, Inc.

(57) ABSTRACT

A method for reducing noise is in a subscriber line interface circuit of a phone includes detecting a work state of the phone, and reading a voltage on hook on the tip wire when the phone is in the on hook state. Voltages of an off hook state on the tip wire and a voltage off hook state on the ring wire are read when the phone is in the off hook state, and calculation of a public voltage based on the voltages in the register, and loading the public voltage on the ring wire are done. The public voltage on the ring wire are converted into oscillatory voltages on the ring wire in symmetric wave forms having phases opposite to those on the tip wire, when the phone is in the pulse dialing state.

4 Claims, 4 Drawing Sheets

(on hook)

(off hook)

(pulse dialing)

PHONE AND METHOD FOR REDUCING NOISE IN A SUBSCRIBER LINE INTERFACE CIRCUIT THEREOF

BACKGROUND

1. Technical Field

Embodiments of the present disclosure relate to phones, and especially to a subscriber line interface circuit (SLIC) of a phone.

2. Description of Related Art

A subscriber line interface circuit (SLIC) is operable to connect subscribers and switches. However, noise, such as crosstalk, may occur when many subscribers use the SLIC at the same time.

FIG. 4 shows technical standards of the Nippon Telegraph and Telephone Corporation (NTT). A difference value between a ring wire and a tip wire should sustain approximately 48V when a phone is in an on hook state. As shown for the SLIC, the phone is in a constant voltage mode and the difference value between the tip wire and ring wire is generally 48V, when the phone is in the on hook state. The phone is in a constant current mode and a current value is generally 22 mA, when the phone is in an off hook state. The ring wire and the tip wire generate oscillatory voltages when the phone is in a pulse dialing state, that is, the tip wire and the ring wire will alternate operation between the constant voltage and the constant current, when the phone is in the pulse dialing state. Therefore, the phone may generate crosstalk and disturb neighboring connections.

DETAILED DESCRIPTION

Figure 1:
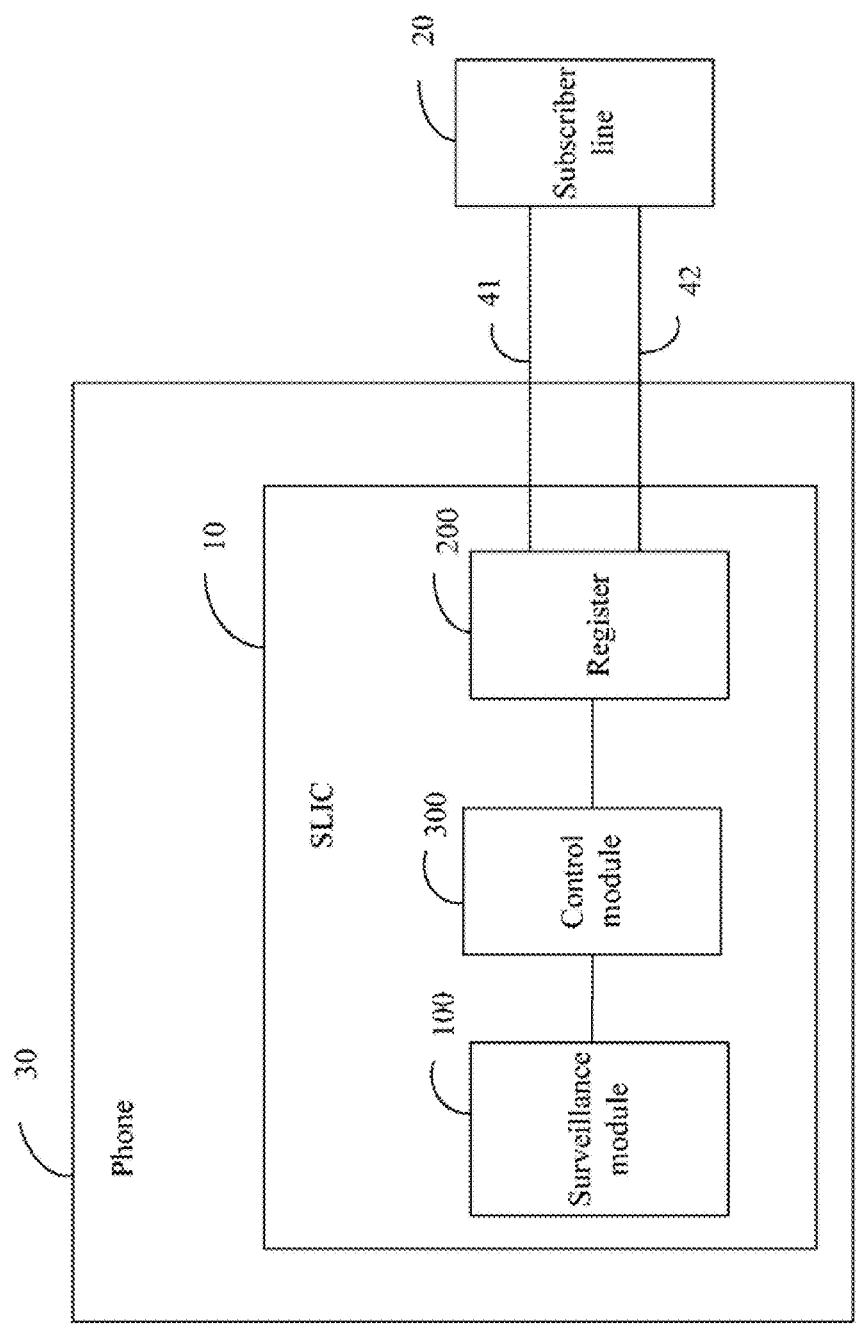
FIG. 1 is a block diagram of an embodiment of a subscriber line interface circuit (SLIC) of a phone and an application environment according to the present disclosure.

Referring to FIG. 1, a block diagram of an embodiment of a subscriber line interface circuit (SLIC) 10 as disclosed and an application environment is shown. The SLIC 10 may be employed in a phone 30, operable to connect to a subscriber line 20 through a tip wire 41 and a ring wire 42. The SLIC 10 comprises a surveillance module 100, a register 200, and a control module 300.

The surveillance module 100 is operable to detect a work state of the phone 30 by receiving a subscriber line signal from the subscriber line 20. In one embodiment, the subscriber line signals comprise an on hook signal, an off hook signal, and a pulse dialing signal. The work state comprises an on hook state, an off hook state, and a pulse dialing state.

The register 200 is connected to the subscriber line 20 through the tip wire 41 and the ring wire 42. The register 200 is operable to read and store voltages of the tip wire 41 and the ring wire 42, when the phone 30 is in the on hook state and the off hook state, respectively.

The control module 300 is operable to calculate a public voltage based on the voltages in the register 200. The control module 300 loads the public voltage on the ring wire 42 to convert oscillatory voltages on the ring wire 42. The oscillatory voltages on the ring wire 42 is in symmetric wave forms having phases opposite to those on the tip wire 41, when the surveillance module 100 detects the phone 30 is in the pulse dialing state.

Figure 2:
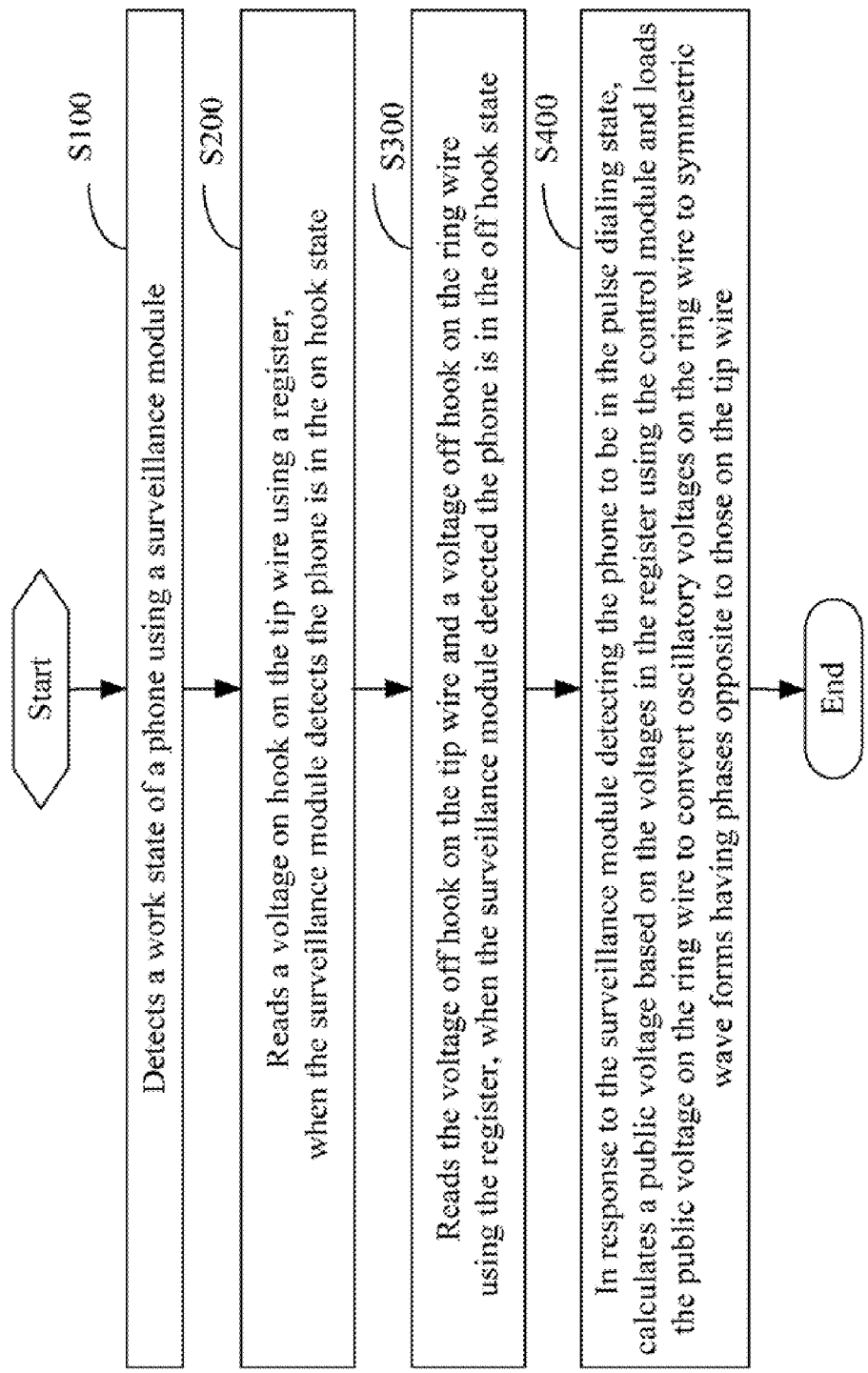
FIG. 2 is a flowchart of one exemplary embodiment of a method for deducing noise in the SLIC according to the present disclosure.

Referring to FIG. 2, a flowchart of an exemplary embodiment of a method for reducing noise in a SLIC 10 of a phone 30 is shown. In block S100, a surveillance module 100 detects a work state of the phone 30. A control module 300 implements block S200 when the surveillance module 100 detects the phone 30 is in an on hook state. The control module 300 implements block S300 when the surveillance module 100 detects the phone 30 is in the off hook state. The control module 300 implements block S400 when the surveillance module 100 detects the phone 30 is in the pulse dialing state.

In block S200, the register 200 reads and stores a voltage on hook on the tip wire 41 V1, when the phone 30 is in the on hook state. In one exemplary embodiment, V1=−4V, for example.

In block S300, the register 200 reads and stores the voltage off hook on the ring wire 41 V2 and the voltage off hook on the tip wire 42 V3, respectively, when the phone 30 is in the off hook state. In one exemplary embodiment, V2=−14V, and V3=−37V, for example.

In one embodiment, impedances of the phone 30 may change according to state transitions from the on hook state to the off hook state. Generally, the voltage on the tip wire 41 drops, and the voltage on the ring wire 42 increases, with the phone 30 transitioning states from on hook to off hook, and the changing ranges of the tip wire 41 and the ring wire 42 differing.

In block S400, the control module 300 calculates a public voltage V4 based on the voltages, such as V1, V2 and V3, in the register 200. Then, the control module 300 loads the public voltage V4 on the ring wire 42 to convert oscillatory voltages on the ring wire 42. In this situation, the oscillatory voltages on the ring wire 42 is in symmetric wave forms having phases opposite to those on the tip wire 41, when the phone 30 is in the pulse dialing state.

In one embodiment, the oscillatory voltages are voltages high and low on both the tip wire 41 and the ring wire 42, when the phone 30 is in the pulse dialing state. In one embodiment, a wave crest of the oscillatory voltage on the tip wire 41 occurs when the phone is in the off hook state, and the value is V1. A wave trough of the oscillatory voltage on the tip wire 41 is occurs when the phone is in the on hook state, and the values is V2. A wave crest of the oscillatory voltage on the ring wire 42 occurs when the phone is in the off hook state, and the value is V3. A wave trough of the oscillatory voltage on the ring wire 42 is calculated by the control module 300, and the value is the pubic voltage V4.

In one embodiment, public voltage V4 is calculated as follows: the public voltage V4 is equal to the voltage on hook on the tip wire V1−(the voltage off hook on the tip wire V2−the voltage off hook on the ring wire V3)−(the voltage on hook on the tip wire V1−the voltage off hook on the tip wire V2)×2.

That is, V4−V3=V2−V1, in short. In one embodiment, the changing range on the ring wire 42 is equal to that on the tip wire 41, therefore, the oscillatory voltages on the ring wire 42 are in symmetric wave forms having opposite phases to those on the tip wire 41, when the phone 30 is in the pulse dialing state.

Figure 3:
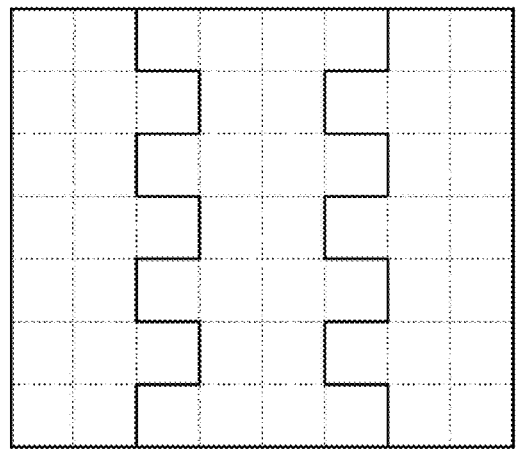
FIG. 3 is a transition graph of three states of a phone according to the present disclosure.
Figure 3:
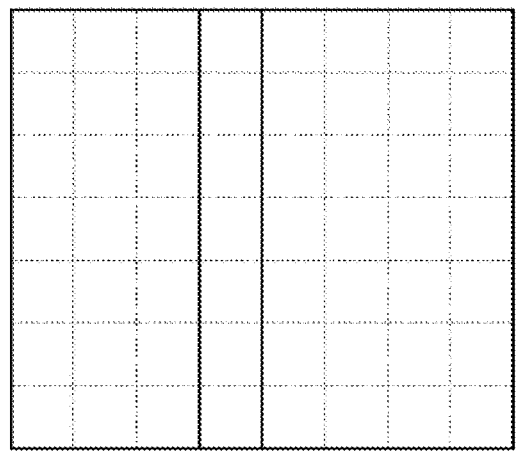
Figure 3:
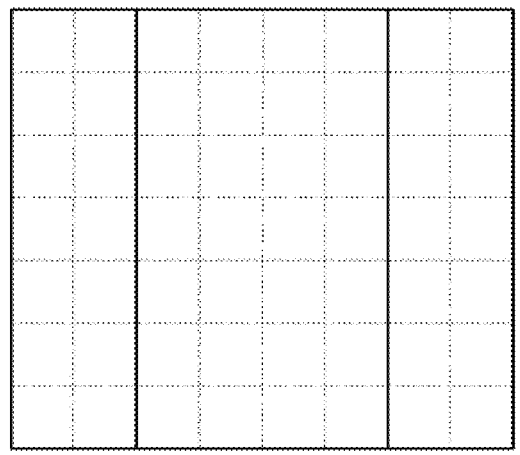
Figure 4:
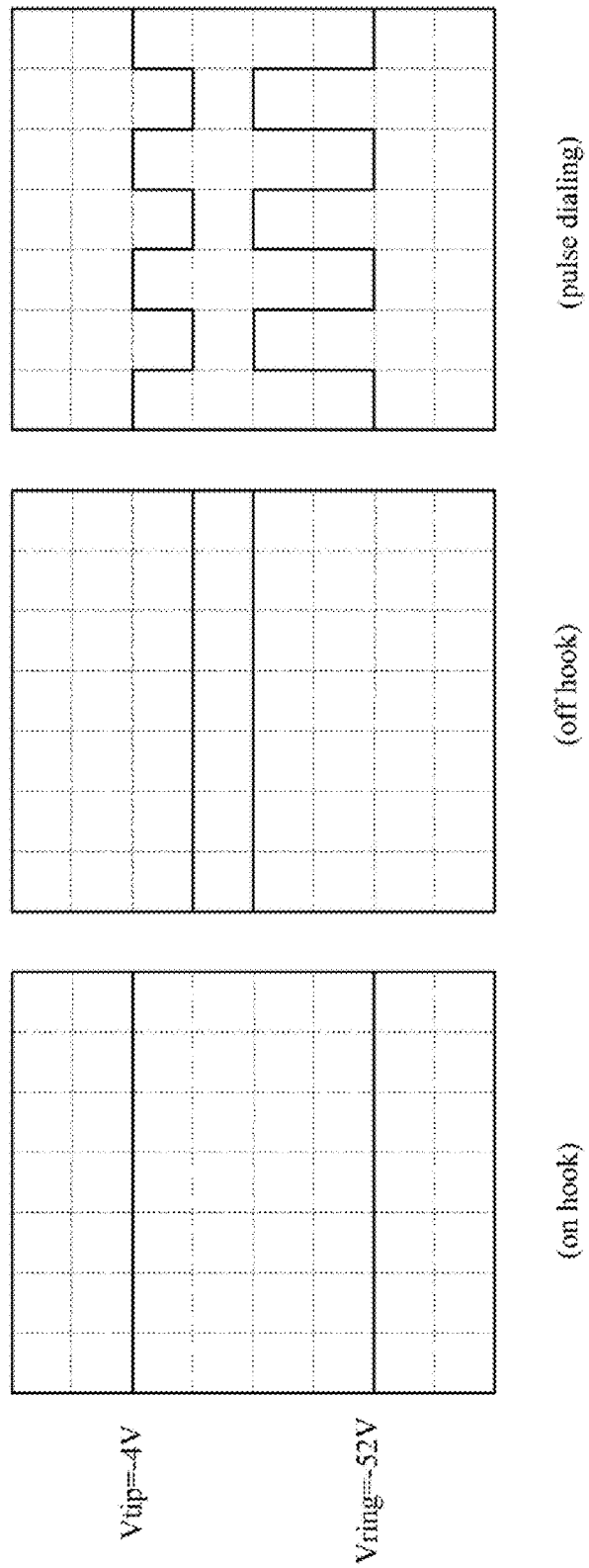
FIG. 4 is a transition graph of three states of the phone in common use.

As shown in FIG. 3, the oscillatory voltages on the ring wire 42 are in symmetric wave forms having opposite phases to those on the tip wire 41, when the phone 30 is in the pulse dialing state. Therefore, the SLIC 10 reduces noise generated by electromagnetic effect, that is, reduce the crosstalk to the neighboring phones.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A method for reducing noises in a subscriber line interface circuit (SLIC) of a phone, the SLIC comprising a surveillance module, a control module and a register, the method comprising:

detecting a work state of the phone using the surveillance module, wherein the work state comprising an on hook state, an off hook state and a pulse dialing state;

reading a voltage on hook on the tip wire using the register when the surveillance module detects the phone is in the on hook state;

reading a voltage off hook on the tip wire and a voltage off hook on the ring wire using the register when the surveillance module detects the phone is in the off hook state; and in response to the surveillance module detecting the phone to be in the pulse dialing state, calculating a public voltage based on the voltages in the register using the control module and loading the public voltage on the ring wire to convert oscillatory voltages on the ring wire to symmetric wave forms having phases opposite to those on the tip wire.

2. The method as claimed in claim 1, wherein the public voltage is approximately equal to:

the voltage on hook on the tip wire−(the voltage off hook on the tip wire−the voltage off hook on the ring wire)−(the voltage on hook on the tip wire−the voltage off hook on the tip wire)×2.

3. A phone comprising a subscriber line interface circuit (SLIC), the SLIC comprising:

a surveillance module operable to detect a work state of the phone by receiving subscriber line signal from a subscriber line, from among an on hook state, an off hook state, and a pulse dialing state;

a register connected to the subscriber line through a ring wire and a tip wire, operable to read and store voltages on the tip wire and the ring wire when the phone is in the on the hook state and the off hook state; and a control module operable to calculate a public voltage based on the voltages in the register, and load the public voltage on the ring wire to convert oscillatory voltage on the ring wire to symmetric wave forms having phase opposite to that on the tip wire, in response to the surveillance module detecting the phone to be in the pulse dialing state.

4. The phone as claimed in claim 3, wherein the public voltage is approximately equal to:

a voltage on hook on the tip wire−(a voltage off hook on the tip wire−a voltage off hook on the ring wire)−(a voltage on hook on the tip wire−a voltage off hook on the tip wire)×2.

* * * * *